S. SPARROW.
SPEED CONTROLLING APPARATUS.
APPLICATION FILED FEB. 27, 1919.

1,330,961. Patented Feb. 17, 1920.

WITNESS
W. A. Alexander.

INVENTOR.
Simon Sparrow
BY E. E. Huffman
ATTORNEY.

UNITED STATES PATENT OFFICE.

SIMON SPARROW, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

SPEED-CONTROLLING APPARATUS.

1,330,961.     Specification of Letters Patent.     Patented Feb. 17, 1920.

Application filed February 27, 1919. Serial No. 279,554.

*To all whom it may concern:*

Be it known that I, SIMON SPARROW, a citizen of the United States of America, residing at the city of St. Louis, State of Missouri, United States of America, have invented a certain new and useful Speed-Controlling Apparatus, of which the following is such a full, clear, and exact description as will enable anyone skilled in the art to which it appertains to make and use the same, reference being had to the accompanying drawings, forming part of this specification.

My invention relates to means for controlling the speed of an internal combustion engine or other prime mover.

In carrying out my invention, I provide a dynamo electric machine driven by the prime mover to be regulated, and connected to a storage battery, and I utilize the E. M. F. generated in the armature conductors of this dynamo electric machine by rotation in the armature reaction field for the purpose of energizing an electromagnetic device controlling a throttle valve, or the fuel supplied to the prime mover. This electromagnetic device may be in the form of a relay having an armature adapted to rotate or to execute a longitudinal or some other form of movement.

Figure 1:
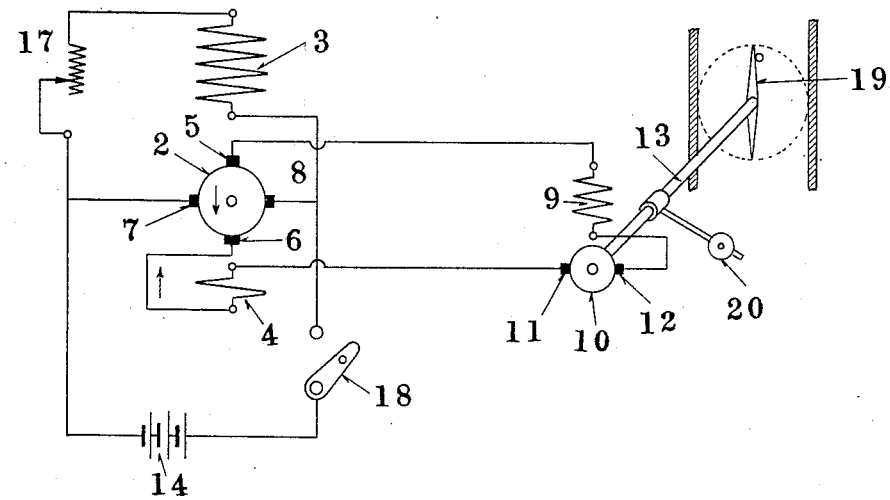
Figure 2:
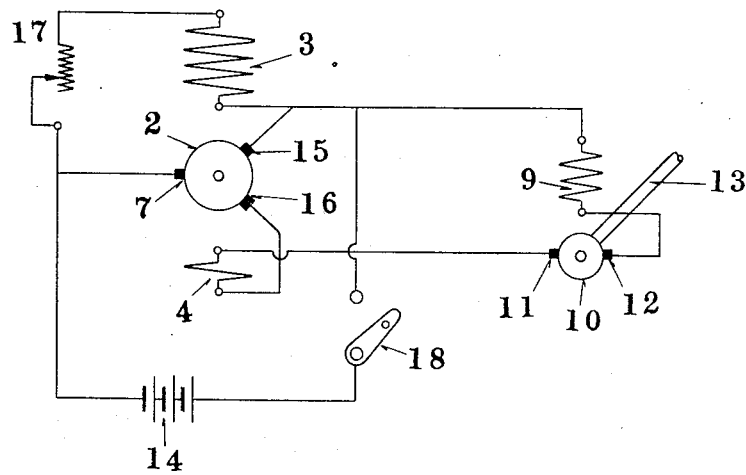

My invention will be better understood by reference to the accompanying drawings in which Figure 1 is a diagrammatic illustration of one embodiment thereof, while Fig. 2 illustrates a modification.

Referring to Fig. 1, the dynamo electric machine coupled to the prime mover or driven thereby in some other manner comprises an armature 2, provided with a commuted winding coöperating with two sets of brushes displaced by 90 electrical degrees. One of these sets comprises the brushes 5, 6, the other, the brushes 7, 8. The field structure carries a shunt exciting winding 3 connected to the main brushes 7, 8 through the adjustable resistance 17, and produces a magnetization substantially at right angles to that produced from the armature by current passing through the brushes 7, 8. The neutralizing winding 4 located on the field structure produces a magnetization substantially in line with and opposed to that produced from the armature by current circulating through the auxiliary brushes 5, 6. The main brushes 7, 8 are connected to the storage battery 14, through the switch 18. The circuit of the auxiliary brushes 5, 6 comprises the neutralizing winding 4 and a relay in control of the shaft 13, upon which the butterfly throttle valve of an internal combustion engine may be mounted. This relay is here shown in the form of a series motor, the armature 10 of which is mounted on the shaft 13 and is connected in series with the field winding 9 by means of the brushes 11, 12.

The arrangement shown in Fig. 2 differs from that illustrated in Fig. 1 in that the brush 8 has been replaced by two brushes 15, 16, symmetrically located on either side of an axis perpendicular to that of the shunt winding 3 and the neutralizing winding 4. The shunt winding 3 is connected between the brushes 7 and 15, and the relay 9, 10 is connected between the brushes 15, 16. The battery 14 is again in parallel with the shunt winding 3 and its regulating resistance 17. The switch 18 makes it possible to disconnect the battery 14 from the dynamo electric machine.

In the operation of the device of Fig. 1, the throttle valve controlled by the shaft 13 is normally held open. As soon as the speed of the prime mover has reached a high enough value, switch 18 may be closed, thus connecting the generator 2 to the battery 14. For a given speed of the prime mover, the generator will float on the battery, or vice versa. Should the speed of the prime mover increase beyond the floating speed, then a charging current will flow into the battery and an armature reaction field will be set up along the axis 7, 8 of the machine. Because of the rotation of the armature in this field, an E. M. F. will appear at the brushes 5, 6 which will send a current through the relay 9, 10, causing same to exert a torque on the shaft 13. This torque acts against a spring or a weight attached to the shaft 13 and when the torque has reached a sufficient value, the resistance of the spring or of the weight will be overcome to a certain extent, and the shaft turned through a certain angle. This movement diminishes the throttle valve opening. In order to set the apparatus to keep the engine to a given speed with a given setting of the adjustable resistance 17, it is only necessary to suitably adjust the tension of the spring, or the magnitude or location of the weight attached to the shaft 13. The speed of the engine may be varied either by varying the adjustable resistance 17 or the spring tension. The former, of course, is the easier way of achieving the result. The greater the resistance inserted into the circuit of the shunt winding 3, the higher the speed at which the relay will come into operation.

The winding 4 is provided for the purpose of eliminating the armature reaction due to the relay current. This armature reaction appears in the axis of the shunt winding 3, and would affect the total magnetization of the machine if not taken care of. It is, however, not necessary to make use of this neutralizing winding, or of any equivalent means for taking care of the armature reaction along the axis 5, 6.

The arrangement shown in Fig. 2 does not materially differ as to operation from that shown in Fig. 1. The voltage derived from the brushes 15, 16 and impressed on the relay circuit is less than the maximum voltage available along that axis of the shunt winding 3, but it is directly proportional to same. The effect of connecting the shunt winding and the battery to the brushes 7, 15 located on a line parallel to an axis displaced by less than 90 electrical degrees from that of the winding 3, is equivalent to providing the stator with a winding in series with the load—in this case, in series with the battery 14. If brush 7 is connected to brush 15 as shown, then for a given direction of rotation, the effect will be the same as if the series winding just mentioned were connected to add to the magnetization produced by 3. Connecting the battery and the field winding 3 between brushes 7, 16 would be equivalent to reversing the series winding, and thus de-compounding the machine. The former arrangement is preferred.

Having fully described my invention, what I claim as new and desire to secure by Letters Patent of the United States is:

1. The combination of a prime mover, speed controlling means therefor, a generator driven by the prime mover, a source of substantially constant E. M. F. connected to oppose the terminal E. M. F. of the generator, and means controlled by the armature reaction flux of the generator for actuating the speed controlling means.

2. The combination of a prime mover, speed controlling means therefor, a generator driven by the prime mover, a consumption circuit supplied by the generator, and means controlled by the armature reaction flux of the generator for actuating the speed controlling means.

3. The combination of a prime mover, speed controlling means therefor, a generator driven by the prime mover, a source of substantially constant E. M. F. connected to oppose the terminal E. M. F. of the generator, and means controlled by the combined effect of the armature reaction flux and speed of the generator for actuating the speed controlling means.

4. The combination of a prime mover, speed controlling means therefor, a generator driven by the prime mover and provided with a shunt exciting winding, means for varying the resistance of the exciting circuit, a source of substantially constant E. M. F. connected to oppose the terminal E. M. F. of the generator, and means controlled by the armature reaction flux of the generator for actuating the speed controlling means.

5. The combination of a prime mover, speed controlling means therefor, electromagnetic means for actuating the controlling means, a generator driven by the prime mover and provided with an exciting winding, a storage battery connected to the main brushes of the generator, and means connecting the electromagnetic actuating means in circuit with the armature of the generator along an axis displaced from the axis of the main brushes.

6. The combination of a prime mover, a speed controlling and normally open valve therefor, a generator driven by the prime mover, a consumption circuit supplied by the generator, and means controlled by the armature reaction flux of the generator for moving the speed controlling valve toward its closed position.

In testimony whereof, I have hereunto set my hand and affixed my seal.

SIMON SPARROW. [L. S.]